Patented Dec. 9, 1952

2,621,192

UNITED STATES PATENT OFFICE 2,621,192

PRODUCTION OF ORGANIC COMPOUNDS

John H. Haslam, Arden, Del., assignor to E. I. du Pont de Nemours and Company, Wilmington, Del., a corporation of Delaware No Drawing. Application July 11, 1949, Serial No. 104,147

16 Claims. (Cl. 260—413)

This invention relates to the production of bis organic compounds and to novel methods for obtaining such compounds. More particularly it relates to the preparation of these compounds by a condensation type reaction employing a titanium halide as a catalyst.

Aluminum chloride is a known catalyst for condensing certain aliphatic and aromatic compounds to obtain certain mono derivatives thereof. If employed in an attempt to prepare bis derivatives, more stringent, higher temperature conditions oftentimes must prevail and in many reactions such conditions result in a useless, viscous, black, tarry reaction mass. For example, when aluminum chloride is resorted to in condensing oleic acid under relatively mild (say, 40° C.) temperature conditions with an aromatic compound, such as diphenyl, a mono derivative reaction product results. When, however, resort is had to the relatively higher (above 60° C.) temperatures required for producing bis derivatives in this reaction, the aluminum chloride attacks the oleic acid, brings about undesired condensation reactions and tar formation, and an intractable type of reaction product is obtained which is fit only for discard. These same results accrue when ferric chloride is employed as a catalyst in lieu of aluminum chloride.

It has now been discovered that titanium halides, such as titanium tetrachloride, possess unique and surprisingly valuable properties for synthesizing certain bis organic compounds in reactions of the type referred to, and that such halides are especially useful in the preparation of bis derivative compounds of benzene, diphenyl and naphthalene with certain relatively long-chain, unsaturated, aliphatic acids or their derivatives, containing primary chains having at least 8 carbon atoms and at least one

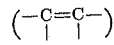

group unconjugated with the carbonyl group. These addition compounds contain as an essential structural unit an aryl hydrocarbon selected from the group just referred to, and are characterized by the general formula R—X—R in which X is an aryl hydrocarbon selected from the group consisting of benzene, diphenyl and naphthalene, and R is an organic radical having a primary aliphatic chain containing at least eight carbon atoms at least one of which carbons exists in a carbonyl group and another of which is bound directly to the aryl hydrocarbon.

In its broader aspects, the invention comprises commingling an aryl compound of the type mentioned with a titanium halide, such as titanium tetrachloride, mixing therewith a long-chain, unsaturated monocarboxylic acid or derivative thereof whose primary chain is aliphatic and contains at least 8 carbon atoms and at least one double bond carbon group removed at least to the beta-gamma position from the carbonyl group, heating the resulting mixture to a temperature adequate to effect formation of the desired bis compound, and upon completion of the reaction recovering the bis compound from the reaction product.

In one preferred adaptation of the invention, benzene and liquid titanium chloride are first suitably mixed in a reaction vessel with an inert solvent, such as n-heptane or cyclohexane, or other organic solvent which functions to keep the reactants fluids and promotes their ease of handling. The mixture grows cooler during this operation, presumably due to the negative heat of formation of some catalyst-benzene complex, or to the negative heat of solution of the benzene, or both. To the resulting mixture an equivalent or excess amount of oleic or other organic acid having the formula

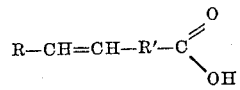

wherein the primary chains of R and R' are aliphatic radicals together totaling at least 5 carbon atoms, and R' being at least 1 carbon atom, is then added, the addition being at such a rate that excessive temperature rise is avoided and undesired polymerization or volatilization of the reactants is prevented. Upon completion of the acid addition, the mass is heated under refluxing conditions to a temperature preferably ranging from 60° C. to 65° C., being maintained at such temperatures until completion of the reaction, which usually requires several hours. In the reaction and instead of obtaining the expected mono-acid benzene addition compound due to saturation of the

group of a single molecule of the acid, the titanium catalyst promotes and implements a further reaction and causes the other or para end of the benzene molecule to combine with another acid molecule to result in formation of a startlingly large yield of benzene bis stearic acid containing the essential structural unit,

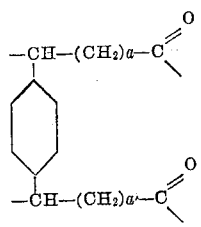

wherein $a$ and $a'$ are integers each equalling at least 1. This reaction product is then drowned in water to form a water layer containing the catalyst in solution and an oil layer of the desired product. These are separated, with the oily material being washed acid-free and purified by stripping from the solvent any water or unreacted materials remaining therein. A final purification is conventionally effected, such as by molecular distillation. The final product comprises a light-brown oil mixture of the benzene-acid material addition compound, e. g., a mixture of phenyl stearic acid and the new, most difficultly-obtainable material, benzene bis stearic acid. Titanium halide catalyst values remaining in the water layer can be separately recovered for re-use by any desired, conventional method. Similarly, the solvent and unreacted material recovered can be recycled as desired for re-use in the system.

The compounds of this invention are adaptable for wide commercial usage. They are particularly valuable as intermediates in organic syntheses, as monomers in various polymerization operations, and as heat exchange media, etc. The bis derivatives which are formed herein have (a) lower vapor pressures at elevated temperatures, (b) lower freezing points, and (c) are bi-functional to allow production therefrom of poly esters and poly amides, whereby such materials become attractively useful in lubricants, oils and greases, as plasticizers, and, in the form of polymers, as additives for detergents and adhesives and as paints and protective coatings, etc. Derivatives of the new acids of this invention can be readily formed by the usual prior art reactions, as already noted in the examples. For instance, benzene or other type acids obtained herein can be readily reacted with alcohols to form esters; with amines to form amides; or with metal hydroxides or other compounds of the desired metal to form the corresponding metal salts. If desired, the corresponding derivative of the unsaturated acid may first be prepared and benzene or other aryl hydrocarbon compound saturation subsequently effected, with the end product being the same. Preferably, however, the phenyl-saturated acid is first prepared, following which its derivative is then formed. For some reason addition of the aromatic compound to the pure acid seems to occur more rapidly and efficiently.

To a clearer understanding of the invention, the following examples, which are merely illustrative in character and not to be construed as in limitation of the invention, are given:

*Example I*

80 parts by weight of benzene and 500 parts by weight of TiCl$_4$ were mixed together in 390 parts by weight of cyclohexane. The temperature of the mixture dropped from 22° C. to 15° C. To this material were then added over a period of two hours and with continuous agitation 600 parts by weight of oleic acid. The temperature rose as the oleic acid was added, and the rate of addition of the acid was regulated so that the temperature remained between 60° C. and 65° C. throughout the operation. Heating was continued at 60°-65° C. for four more hours. A dark brown, viscous liquid resulted. This was poured into water with agitation, the temperature being kept below 60° C. in order to prevent hydrolysis of the TiCl$_4$ catalyst by the water and consequent formation of TiO$_2$.

When mixing was complete, agitation was stopped and the material separated into two layers: (1) a water layer containing the titanium values, and (2) an oil layer containing the crude product. The oil layer was separated out and washed until free from chloride ions. The oil was then boiled to remove the solvent and any trapped water, following which it was purified by conventional means. The final product was a light-brown, viscous material comprising a mixture of phenyl stearic acid and benzene bis stearic acid. The yield was 78.0%.

The mixed acid product was converted to methyl esters by commingling 1 part by volume of the product and 3 parts by volume of methanol. The mass was refluxed for four hours in the presence of a small amount of sulphuric acid as a catalyst. The material was then washed, purified, and subjected to distillation at 4 microns mercury pressure in a centrifugal-type molecular still. Results showed that the product contained 36.2% of the methyl ester of phenyl stearic acid and 50.3% of the methyl ester of benzene bis stearic acid:

| Fraction | B. P., ° C. | Percent |
|---|---|---|
| 1 | 190-195 | 36.2 |
| 2 | 200-205 | 7.5 |
| 3 | 250-260 | 50.3 |
| 4 | 280-285 | 5.2 |

The molecular weight of fraction 1 was found to be 378, and its saponification equivalent 365; theoretical molecular weight and saponification equivalent for the methyl ester of phenyl stearic acid would be 374.

The molecular weight of fraction 3 was 664, and its saponification equivalent 360; theoretical values for the methyl ester of benzene bis stearic acid are, respectively, 670 and 335.

*Example II*

78 parts by weight of benzene and 500 parts by weight of TiCl$_4$ were mixed in n-heptane. 400 parts by weight of linoleic acid were slowly added thereto, while maintaining the temperature of reaction at about 60° C. After all of the linoleic acid had been added, heating at this same temperature was continued for 4 hours, the mass being refluxed meanwhile. A brown, oily product was recovered and purified substantially as in Example I. A 78.5% yield of predominantly di-benzene bis stearic acid was obtained, containing minor quantities of benzene bis oleic acid and phenyl oleic acid.

*Example III*

78 parts by weight of benzene were mixed with 1000 parts of TiCl$_4$. (This quantity of catalyst represented excess employed simply to fluidize the mass for easy handling.) 405 parts of undecylenic acid were added slowly, while maintaining the temperature at 40° C. or less. When all of the acid had been added, the mass was kept at 40° C. for 4 hours, after which it was drowned in water and mixed with 1000 parts by weight of hexane. The material separated into a water layer containing the catalyst, which was decanted, and a hexane layer containing the product, which was washed acid-free and purified by stripping off the hexane and vacuum-distilling. The product comprised benzene-undecylenic acid addition compounds in about 90% yield of the theoretical, with 65% thereof being benzene bis undecylic acid.

Example IV 128 grams of naphthalene were mixed with 1 liter of cyclohexane solvent and 500 grams of TiCl4. To this mixture were added 800 grams of oleic acid, with agitation, so regulating the addition that the mass did not exceed 60° C. in temperature. When addition of the oleic acid was complete, the material was held at 60° C. for six hours. This material was hydrolyzed to form a thick, light-brown product comprising naphthyl bis stearic acid. After being washed acid-free, the acid was converted, by conventional means, to its methyl ester, and the ester stripped of cyclohexane solvent and distilled in vacuo. An 86% yield of the methyl ester of naphthyl bis stearic acid was obtained, which was a pale brown oil of medium viscosity. U. V. absorption tests, as described in the above examples, showed the presence of naphthalene in this compound. Molecular weight of the material was 770 and its saponification equivalent 400, to thus further establish that the product comprised the bis compound.

Example V

Diphenyl-oleic acid addition compounds were prepared in the following manner: 1250 grams of diphenyl were mixed with 11.4 liters of TiCl4. This quantity of titanium halide was designed to afford catalytic action and to provide an excess to fluidize the mass. 7.5 liters of oleic acid were added to the mixture at a slow rate designed to keep the temperature of the mass at 60° C. When all of the acid had been added, external heat was applied to maintain the temperature at 60° C. for 6 hours and result in a thick, tarry, black mass. This was drowned in water with agitation to give a water-oil emulsion. A small quantity of cyclohexane was added to break the emulsion and separate the product into a water layer containing the titanium chloride and an oil layer containing the product. This latter layer was purified by stripping off the solvent and molecular-distilling to remove and recycle unreacted or polymerized oleic acid. The residue comprised a viscous, light-brown oil mixture of diphenyl stearic acid and diphenyl bis stearic acid, in 85% yield. The pour point of the bis acid material was −12° C.

The methyl esters of these acids were prepared by mixing one volume of the product oil with 3 volumes of methanol and .01 volume of sulphuric acid as a catalyst. The material was refluxed for 4 hours, washed with water, and distilled in a centrifugal-type molecular still at 4 microns mercury pressure. This distillation gave the following fractions:

| Fraction | B. P., ° C. | Percent |
|---|---|---|
| 1 | 225 | 16.1 |
| 2 | 275 | 23.2 |
| 3 | 325 | 31.5 |
| 4 | 375 | 22.5 |
| Residue | | 6.7 |

Molecular weights and saponification equivalents showed fraction 1 to be diphenyl methyl stearate; fraction 2, a mixture of diphenyl methyl and diphenyl bis methyl stearates; fractions 3 and 4, the pure diphenyl bis methyl stearate. The pour point of fractions 3 and 4 was −25° C.; and ultra-violet absorption, as measured by a spectrophotometer, showed a maximum at 2500 Å. with an extinction coefficient of 21.

Diphenyl bis octyl stearate was prepared on a laboratory scale by refluxing for 4 hours at 150° C. a mixture of 100 grams of diphenyl bis methyl stearate, 500 ml. of 2-ethyl hexanol, and 5 ml. of phosphoric acid as a catalyst. A viscous, light-brown oil was recovered, having a saponification equivalent of 696 (theoretical for the said octyl ester would be 686).

Example VI 154 parts by weight of diphenyl and 500 parts by weight of TiCl4 were mixed in 250 parts of cyclohexane. To the resulting mixture 600 parts of linoleic acid were slowly added with maintenance of the temperature of reaction at about 80° C. Upon completion of the linoleic acid addition, the reaction mass was continuously maintained at the same 80° C. temperature for 4 hours. At the end of this period, the mass became viscous and dark as in the previous examples. After purification, a 78% product yield was obtained having a molecular weight of about 1215 and neutralization equivalent of 692. This material comprised a mixture of polymers in which the acid radicals were linked by diphenyl groups. A spectrophotometer demonstrated that ultra-violet absorption was at its maximum at 2550 Å. with an extinction coefficient of 32.9.

Example VII 77 parts by weight of diphenyl and 250 parts by weight of TiCl4 were mixed with 100 parts by weight of n-heptane as an inert solvent. To this mixture 200 parts by weight of undecylenic acid were added and at such a rate that the temperature of the mass remained at or below 40° C. After being maintained at this temperature to completion of the reaction, the resulting product comprised a dark, viscous mass. This product was refluxed, with agitation, for 12 hours; drowned in water; separated therefrom; and washed water-free with methanol. The water-methanol layer was then separated from the oil layer which formed, and to the latter 200 parts by weight of methanol and 5 parts of sulphuric acid were added. This mass was then refluxed for 4 hours, drowned in water, stripped of solvent, and vacuum-distilled at 1 mm. pressure to remove unreacted acid and diphenyl. As a result, a 96.5% yield of the methyl esters of diphenyl undecylic and diphenyl bis undecylic acids was obtained. Ultra-violet absorption, as measured by a spectrophotometer, showed a maximum at 2475Å. and the extinction coefficient was 24 (proving the diphenyl group). The molecular weight of the bis methyl ester was 600, and its saponification equivalent was 280; theoretical values for these would be 550 and 275, respectively. Pour point of the same ester was −18° C.

While described as applied to certain specific and preferred embodiments, the invention is not restricted thereto. In general, use is contemplated herein of any unsaturated, monocarboxylic acid or derivative thereof whose primary chain is aliphatic, contains at least 8 (preferably from 10–18) carbon atoms, and at least one double-bond carbon $$\left(-\underset{|}{C}=\underset{|}{C}-\right)$$

group, the latter being removed at least to the beta-gamma position from a carbonyl $$\left(-\underset{|}{C}=O\right)$$

group. Organic compounds, the double-bond carbon group of which is conjugated with the carbonyl group, e. g., crotonic acid, are not utilizable herein because they either fail to react in the process or polymerize to form products which contain no aryl groups sought to be added. To be useful, the monobasic acid or derivative being saturated must be free from such conjugation and the double-bond carbon group must originate at a position at least beta to a carbonyl unit. Specific examples of these utilizable compounds include those having but one double-bond carbon group far removed from the carbonyl group, such as oleic acid, elaidic acid, 8-undecylenic acid, 9-undecylenic acid, etc.; those containing two such double-bond groups such as linoleic acid, etc.; those containing three such groups such as linolenic acid and the like.

The particular proportions or ratios of acid reactant to the aryl hydrocarbon compound used are variable and depend upon the specific type or mixture of end product desired. In general, amounts ranging from 0.25 to 0.7 mol of the aryl hydrocarbon per mol of the monocarboxylic acid or derivative thereof can be employed, with ratios ranging from about 0.35 to 0.45 mol of said aryl per mol of the acid reactant being preferred when optimum preparation of the desired bis compounds is to be effected.

The conditions of temperature, pressure, reaction time, purification techniques, etc., which are resorted to can be varied somewhat and will be found to be interdependent with the particular reactants chosen and the end products desired. Benzene volatilizes at about 80° C. so that, in general, the temperature used when it is employed should be held below this figure, or, in the alternative, refluxing should be resorted to. Also, when employing the preferred catalyst, $TiCl_4$, for obtaining bis derivatives from oleic acid and diphenyl, temperatures of at least 60° C. will be found to be required, and the utilization of temperatures ranging from 60–70° C. will result in the production of the desired bis derivative together with a minor amount of a mono derivative. In these instances the optimum temperature to be resorted to in producing the bis derivative and employing $TiCl_4$ as the catalyst will vary with the aryl reactant employed but usually is in accordance with the approximate figures given in the following table:

|  | °C. |
|---|---|
| Oleic acid and diphenyl | 65 |
| Oleic acid and naphthalene | 60 |
| Oleic acid and benzene | 70 |
| Undecylenic acid and diphenyl | 40 |
| Linoleic acid and diphenyl | 60 |

The properties of the acid reactant used are also important and must be taken into account. Thus, oleic acid tends to polymerize at temperatures ranging from about 80° C. to 100° C. thereby rendering it preferable to resort to temperatures below such 80° C. figure and to about 60–65° C. when this compound is being saturated. Otherwise, contamination of the end product and production of a difficultly-separable, polymerized material may result. If, however, purification methods, such as molecular distillation, are resorted to, the preference of oleic acid polymers or other contaminants may be relatively unimportant since in this type of purification, such contaminants are readily removed. Again, when benzene is employed, it will be found preferable to first effect mixing of the benzene with the catalyst, following which the reactant acid is then added. Apparently some reaction occurs between the benzene and the catalyst to form an unstable compound or complex which reacts more efficiently with the acid. This advantageously favors the subsequent reaction of the benzene and the acid and such procedure also affords a more accurate control over the reaction temperature.

Any inert type or amount of useful organic solvent adapted to fluidize and render the reaction mass relatively malleable and easy to handle in the equipment used can be employed herein. Where, for example, a dough mixer type of apparatus is resorted to for purposes of effecting agitation of the mass, little or no solvent need be used or will be required. Any type of inert fluid which satisfies the particular properties of solubility and boiling point for a given reaction is contemplated for use. In addition to the n-heptane or cyclo-hexane solvents mentioned, paraffinic hydrocarbons, naphtha fractions, carbon tetrachloride, and the like, can also be utilized.

As a catalyzing reagent, any anhydrous titanium halide, e. g., the chlorides, bromides, or fluorides, can be used in the invention. Of these, anhydrous titanium tetrachloride is preferred for use due to its lower cost and availability and the outstanding results which accrue in respect to high, increased yields, shortened time of reaction, and property of inhibiting the production of undesirable tars in the reaction. Furthermore, when used in excess concentration, it functions as an advantageous fluidizing agent, thereby obviating, in such instances, the necessity of resort to any organic solvent material for that purpose. At the same time, it insures production of a purer, higher-grade type of final product. Other specifically useful titanium halides include those of $TiBr_4$, $TiF_4$, and $TiI_4$.

The quantity of catalyzing agent used is variable and usually is governed by the type and quality of product desired. Generally, the amount used may range from about 2 to about 10 moles of titanium halide per mole of the aryl compound with a preferred concentration, particularly of $TiCl_4$, ranging from about 2 to 4 moles of $TiCl_4$ per mole of such aryl compound. For example, in the production of benzene bis stearic acid, a ratio of 2.5 moles of $TiCl_4$:1 mole of benzene: 2.5 moles of oleic acid will usually suffice. As already indicated, an excess concentration of the catalytic halide can be used, if desired, when both a fluidizing function and a catalyzing effect is to be had in the process.

The novel products of this invention are formed by addition of the aryl compound reactant to the unsaturated organic compounds of the type mentioned, and contain as an essential structural unit:

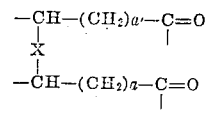

in which X is an aryl hydrocarbon selected from the group consisting of benzene, diphenyl and naphthalene, and $a$ and $a'$ are integers each equalling at least 1. In the reaction the unique effect exerted by the use and presence of the titanium halide is evident from the fact that, contrary to the results experienced when other metal halides are used, the aryl reactant combines with two molecules of the unsaturated acid or derivative to unexpectedly form a high yield of bis compound. In its acid form, such compound has the general formula:

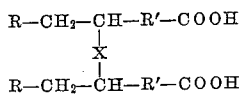

wherein X consists of either benzene, diphenyl or naphthalene and R and R' in each primary chain are aliphatic radicals and together total at least 5 carbon atoms in each of said chains. The reaction appears to terminate at this point, due presumably to stearic hindrance. When the starting acid contains more than one double-bond group, the aryl component may add to each of such groups, thereby rendering possible the preparation of compounds of varying structures and molar proportions of such aryl and acid through variance of the molar ratios of the starting reactants and other operating conditions to obtain many different compounds and mixtures of such compounds. For example, a given reaction may comprise a mixture of the mono and di forms, together with still more complex compounds, depending upon the operating conditions. Following the reaction, such mixtures may be separated into their constituent parts and recovered as such.

I claim as my invention:

1. A process for synthesizing a bis organic compound in high yield which comprises reacting, under an elevated temperature ranging from 60–80° C. and in the presence of a titanium halide, an aryl hydrocarbon selected from the group consisting of benzene, diphenyl and naphthalene, with an aliphatic compound selected from the group consisting of a long-chain, unsaturated, monobasic acid and derivatives thereof, said compound containing in its chain at least 8 carbon atoms and a double-bond carbon group free from conjugation with the carbonyl group, employing in the reaction a ratio of from 0.25 to .7 mol of said aryl hydrocarbon per mol of said aliphatic compound, and on completion of the reaction recovering the resulting bis compound from the reaction products.

2. A process for synthesizing a bis organic compound in high yield which comprises reacting, under an elevated temperature ranging from 60–80° C. and in the presence of titanium tetrachloride, an aryl hydrocarbon selected from the group consisting of benzene, diphenyl and naphthalene, with an aliphatic compound selected from the group consisting of a long-chain, unsaturated, monobasic acid and derivatives thereof, said compound containing in its chain at least 8 carbon atoms and a double-bond carbon group free from conjugation with the carbonyl group, employing in the reaction a ratio of from 0.25 to .7 mol of said aryl hydrocarbon per mol of said aliphatic compound, and on completion of the reaction recovering the resulting bis compound from the reaction products.

3. A method for synthesizing a bis organic compound which comprises commingling benzene, anhydrous titanium tetrachloride, and an inert organic solvent, reacting the resulting mass at a temperature ranging from 60–80° C. with an aliphatic compound selected from the group consisting of a long-chain, unsaturated monobasic acid and derivatives thereof, said chain containing from 10–18 carbon atoms and at least one double-bond carbon group removed at least to the beta-gamma position from the carbonyl group, and recovering the resulting benzene bis addition compound.

4. A method for synthesizing a bis organic compound in high yield which comprises commingling diphenyl, anhydrous titanium tetrachloride, and an inert organic solvent, reacting the resulting mass at a temperature ranging from 60–80° C. with an aliphatic compound selected from the group consisting of a long-chain, unsaturated monobasic acid and derivatives thereof, said chain containing from 10–18 carbon atoms and at least one double-bond carbon group which is removed at least to the beta-gamma position from the carbonyl group, employing in the reaction a ratio of from 0.25 to .7 mol of diphenyl per mol of said aliphatic compound, and recovering the resulting diphenyl bis addition compound.

5. A method for synthesizing a bis organic compound which comprises commingling naphthalene, anhydrous titanium-tetrachloride, and an inert organic solvent, reacting the resulting mass at temperatures ranging from 60° C. to 80° C. with an aliphatic compound selected from the group consisting of a long-chain, unsaturated monobasic acid and derivatives thereof, said chain containing from 10–18 carbon atoms and at least one double-bond carbon group which is removed at least to the beta-gamma position from the carbonyl group, and recovering the resulting diphenyl bis addition compound.

6. A method for synthesizing a bis organic compound which comprises commingling benzene with anhydrous titanium tetrachloride and reacting the resulting mass, at temperatures ranging from 60° C. to 70° C., with an unsaturated acid having the formula

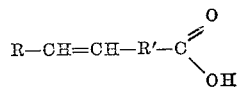

wherein the primary chains of R and R' are aliphatic radicals totaling at least 5 carbon atoms and contain no double-bond carbon group conjugated with a carbonyl group, and recovering the resulting benzene bis acid compound.

7. A method for synthesizing a bis organic compound which comprises commingling benzene and anhydrous titanium tetrachloride, mixing oleic acid therewith, reacting the resulting mass at temperatures ranging from about 60° C. to 65° C., and then recovering the resulting benzene bis stearic compound.

8. A method for synthesizing a bis organic compound which comprises commingling benzene and anhydrous titanium tetrachloride, mixing linoleic acid therewith, reacting the resulting mass at temperatures ranging from about 60° C. to 70° C., and then recovering the resulting benzene bis addition compound.

9. A method for synthesizing a bis organic compound which comprises commingling benzene and anhydrous titanium tetrachloride, mixing undecylenic acid therewith, reacting the resulting mass at temperatures ranging from about 60° C. to 70° C., and then recovering the resulting benzene-addition compound.

10. A method for synthesizing a bis organic compound which comprises commingling diphenyl and anhydrous titanium tetrachloride, mixing oleic acid therewith, employing in the commingling operation from about 0.35 to 0.45 mol of diphenyl per mol of oleic acid, reacting the resulting mass at temperatures ranging from about 60° C. to 65° C., and then recovering the resulting diphenyl-addition compound.

11. A method for synthesizing a bis organic compound which comprises commingling diphenyl and anhydrous titanium tetrachloride, mixing linoelic acid therewith, reacting the resulting mass at temperatures ranging from about 60° C. to 95° C., and then recovering the resulting diphenyl-addition compound.

12. A method for synthesizing a bis organic compound which comprises commingling diphenyl and anhydrous titanium tetrachloride, mixing undecylenic acid therewith, reacting the resulting mass at temperatures ranging from about 40° C. to 70° C., and then recovering the resulting diphenyl-addition compound.

13. A method for synthesizing a bis organic compound which comprises commingling naphthalene and anhydrous titanium tetrachloride, mixing oleic acid therewith, reacting the resulting mass at temperatures ranging from about 60° C. to 65° C., and then recovering the resulting naphthalene-addition compound.

14. A method for synthesizing a bis organic compound which comprises commingling naphthalene and anhydrous titanium tetrachloride, mixing linoleic acid therewith, reacting the resulting mass at temperatures ranging from about 60° C. to 70° C., and then recovering the resulting naphthalene-addition compound.

15. A method for synthesizing a bis organic compound which comprises commingling naphthalene and anhydrous titanium tetrachloride, mixing undecylenic acid therewith, reacting the resulting mass at temperatures ranging from about 60° C. to 70° C., and then recovering the resulting naphthalene-addition compound.

16. A process for the preparation of a bis stearic acid which comprises commingling an aryl hydrocarbon selected from the group consisting of benzene, diphenyl and naphthalene, with anhydrous titanium tetrachloride and an inert organic solvent, adding oleic acid to the resulting mass, employing in the reaction from 0.35 to 0.45 mol of aryl hydrocarbon per mol of oleic acid, refluxing the mixture at temperatures ranging from about 60° C. to 65° C. until completion of the reaction, drowning the resulting reaction product in water, and then separating out, purifying and recovering the resulting bis stearic acid.

JOHN H. HASLAM.

REFERENCES CITED

The following references are of record in the file of this patent:

UNITED STATES PATENTS

| Number | Name | Date |
|---|---|---|
| 2,168,271 | Perquin et al. | Aug. 1, 1939 |

OTHER REFERENCES

Buu-Hoi et al., Bull. Soc. Chim. 10 (1943), pp. 480 and 483.

Groggins, Unit Processes in Organic Synthesis, 3rd ed., 1947, McGraw-Hill Co., N. Y. C., p. 720.